Feb. 15, 1955  P. ANGENIEUX  2,701,982
LARGE APERTURE SIX COMPONENT OPTICAL OBJECTIVE
Filed July 9, 1953
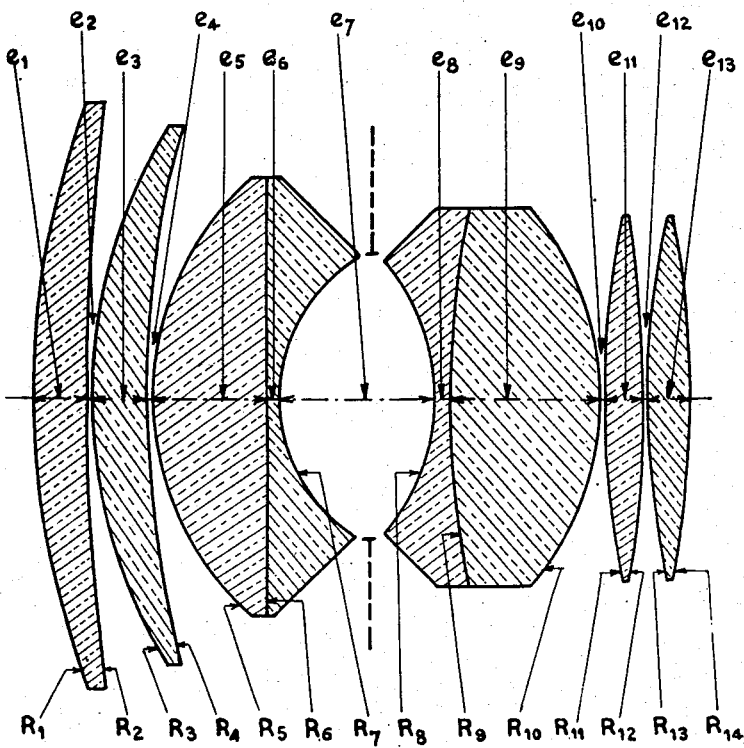

United States Patent Office 2,701,982
Patented Feb. 15, 1955

---

2,701,982

LARGE APERTURE SIX COMPONENT OPTICAL OBJECTIVE

Pierre Angenieux, Paris, France

Application July 9, 1953, Serial No. 367,003

Claims priority, application France March 26, 1953

4 Claims. (Cl. 88—57)

The present invention relates to optical objectives for photographic or projection or like purposes having a very large aperture and which are corrected for spherical aberration, chromatism, coma, astigmatism and distorsion.

An optical objective according to the invention comprises six aligned components separated by air spaces, of which the first, counting from the front to the rear of the objective, is a convergent lens, the second a convergent meniscus lens with both surfaces convex toward the front, the third a meniscus component with both surfaces convex toward the front, the fourth, a meniscus component with both surfaces convex toward the rear, the fifth and the sixth are biconvex lenses.

Moreover, in view of the correction of the chromatic aberrations some of said components may consist of two or more lenses cemented together and to obtain that result it is particularly advantageous to utilize to that end the third and the fourth components which, in this case, are preferably constituted of two lenses cemented together.

Such an objective may be considered as derived from the objectives of the Gauss type, from which it differs by the fact that each of the front lens and the rear lens is subdivided into two lenses. That subdivision permits one to obtain an important increase of the relative aperture while retaining a good correction for spherical aberration.

From the calculations that I have made, it appears that an objective as described above gives very good results when, the focal length of the objective being F, the following requirements are fulfilled: the radius of curvature of the front surface of the second component ranges from 0.6 F to 2 F; the radius of curvature of the front surface of the third component ranges from 0.45 F to 0.8 F; the radius of curvature of the rear surface of the third component ranges from 0.25 F to 0.45 F; the radius of curvature of the front surface of the fourth component ranges from 0.30 F to 0.55 F; the radius of curvature of the rear surface of the fourth component ranges from 0.45 F to 0.80 F; the air space between the third and the fourth component has an axial length ranging from 0.23 F to 0.50 F.

Moreover, though not necessarily, it is also desirable that the following conditions be fulfilled:

The radii of curvature of both surfaces of the fifth component range from F to ∞;

The refractive indices for the D line of the fifth and the sixth components are greater than 1.63;

Each of the third and the fourth components consists of two lenses, namely a dispersive flint lens, cemented to a collective crown lens.

Finally, it must be noted that with an objective constructed according to the invention, if the relative aperture is of the order of 1:1, the back focal length can have a relatively great value, unusual with such an aperture. In fact, said back focal length can be easily greater than 50% of the focal length of the objective, which is obviously desirable in many cases.

In the annexed drawing figure there is shown, by way of example, an axial sectional view of an objective according to the invention, and the table given hereafter indicates, also by way of example, numerical data of an embodiment corresponding to the drawing.

In the drawing and in the table, $R_1$, $R_2$, ... $R_{14}$ are the values of the radii of the refracting surfaces counting from the front to the rear of the objectives; ($e_2$, $e_4$, $e_7$, $e_{10}$, $e_{12}$) are the axial distances between the lenses or components, and ($e_1$, $e_3$, $e_5$, $e_6$, $e_8$, $e_9$, $e_{11}$, $e_{13}$) are the axial thicknesses of the lens elements counting from the front to the rear of the objective. The table, in addition, indicates the values of the refractive index for the D line $n_D$ and the dispersion ratios or Abbe number ($\nu$) of the lens materials of the several lens elements.

Finally, it will be noted that in said example the focal length F of the objective being 100, the back focal length has a value of 56.

In the table below, the radii of curvature are provided with the sign + when the convexity is to the front and with the sign — in the other case.

Focal Length F = 100    Relative Aperture 1:1

| Radii | Thicknesses and Distances | Glass Quality | |
|---|---|---|---|
| | | $n_D$ | $\nu$ |
| $R_1 = +\ 164.13$ | $e_1 = 10.99$ | 1.6751 | 32.3 |
| $R_2 = +\ 559.20$ | $e_2 = 0.23$ | air | |
| $R_3 = +\ 100.12$ | $e_3 = 11.45$ | 1.6689 | 46.7 |
| $R_4 = +\ 213.54$ | $e_4 = 0.23$ | air | |
| $R_5 = +\ 58.04$ | $e_5 = 22.95$ | 1.6913 | 53.8 |
| $R_6 = +2,551.10$ | $e_6 = 2.58$ | 1.6751 | 32.3 |
| $R_7 = +\ 32.39$ | $e_7 = 30.66$ | air | |
| $R_8 = -\ 40.42$ | $e_8 = 2.74$ | 1.6992 | 30.2 |
| $R_9 = +\ 192.98$ | $e_9 = 27.92$ | 1.6204 | 60.2 |
| $R_{10} = -\ 55.53$ | $e_{10} = 0.23$ | air | |
| $R_{11} = +\ 192.98$ | $e_{11} = 7.98$ | 1.6913 | 53.8 |
| $R_{12} = -\ 225.30$ | $e_{12} = 0.23$ | air | |
| $R_{13} = +\ 175.09$ | $e_{13} = 8.48$ | 1.6913 | 53.8 |
| $R_{14} = -\ 203.55$ | | | |

I claim:

1. An optical objective comprising six aligned components separated by air spaces of which the first, counting from the front to the rear of the objective, is a convergent lens, the second a convergent meniscus lens with both surfaces convex toward the front, the third a meniscus component with both surfaces convex toward the front, the fourth, a meniscus component with both surfaces convex toward the rear, the fifth and the sixth components are biconvex lenses, and in which, focal length of the objective being designated by F: the radius of curvature of the front surface of the second component ranges from 0.6 F to 2 F; the radius of curvature of the front surface of the third component ranges from 0.45 F to 0.8 F; the radius of curvature of the rear surface of the third component ranges from 0.25 F to 0.45 F; the radius of curvature of the front surface of the fourth component ranges from 0.30 F to 0.55 F; the radius of curvature of the rear surface of the fourth component ranges from 0.45 F to 0.80 F; the air space between the third and the fourth component has an axial length ranging from 0.23 F to 0.50 F.

2. An optical objective as claimed in claim 1, in which the radii of curvature of both surfaces of the fifth component range from F to ∞.

3. An optical objective as claimed in claim 1, in which each of the third and the fourth components consists of two lenses, namely a dispersive flint lens, cemented to a collective crown lens.

4. An objective having the following numerical data:

Focal Length F=100   Relative Aperture 1:1

| Radii of the Lens Surfaces | Thicknesses and Axial Separations | Glasses | |
|---|---|---|---|
| | | $n_D$ | $\nu$ |
| $R_1 = +\ 164.13$ | $e_1 = 10.99$ | 1.6751 | 32.3 |
| $R_2 = +\ 559.20$ | $e_2 = 0.23$ | air | |
| $R_3 = +\ 100.12$ | $e_3 = 11.45$ | 1.6689 | 46.7 |
| $R_4 = +\ 213.54$ | $e_4 = 0.23$ | air | |
| $R_5 = +\ 58.04$ | $e_5 = 22.95$ | 1.6913 | 53.8 |
| $R_6 = +2551.10$ | $e_6 = 2.58$ | 1.6751 | 32.3 |
| $R_7 = +\ 32.39$ | $e_7 = 30.66$ | air | |
| $R_8 = -\ 40.42$ | $e_8 = 2.74$ | 1.6992 | 30.2 |
| $R_9 = +\ 192.98$ | $e_9 = 27.92$ | 1.6204 | 60.2 |
| $R_{10} = -\ 55.53$ | $e_{10} = 0.23$ | air | |
| $R_{11} = +\ 192.98$ | $e_{11} = 7.98$ | 1.6913 | 53.8 |
| $R_{12} = -\ 225.30$ | $e_{12} = 0.23$ | air | |
| $R_{13} = +\ 175.09$ | $e_{13} = 8.48$ | 1.6913 | 53.8 |
| $R_{14} = -\ 203.55$ | | | | wherein $R_1 \ldots R_{14}$ are the values of the radii of the refracting surfaces counting from the front to the rear of the objective, said values bearing the sign $+$ when the convexity is directed to the front and the sign $-$ when the convexity is directed to the rear; $e_1$, $e_3$, $e_5$, $e_6$, $e_8$, $e_9$, $e_{11}$ and $e_{13}$ denoting the axial thicknesses of lens elements, and $e_2$, $e_4$, $e_7$, $e_{10}$ and $e_{12}$ denoting the axial distance between the components counting from the front to the rear of the objective; and $(n_D)$, $(\nu)$ being respectively the values of the index of refraction and the dispersion ratios or Abbe numbers of the lens materials of the several elements.

References Cited in the file of this patent

UNITED STATES PATENTS

| 2,012,822 | Lee | Aug. 27, 1935 |
| 2,019,985 | Lee | Nov. 5, 1935 |
| 2,117,252 | Lee | May 10, 1938 |
| 2,481,639 | Altman et al. | Sept. 13, 1949 |

FOREIGN PATENTS

| 168,923 | Great Britain | Sept. 12, 1921 |
| 608,661 | Great Britain | Sept. 17, 1948 |